US012543765B2

(12) United States Patent
Sanchez Licea et al.

(10) Patent No.: US 12,543,765 B2
(45) Date of Patent: Feb. 10, 2026

(54) METHOD OF MAKING A DAIRY-FREE SWEETENED CONDENSED MILK

(71) Applicant: SOCIETE DES PRODUITS NESTLE S.A., Vevey (CH)

(72) Inventors: Jose Armando Sanchez Licea, Bern (CH); Nicole Rebekka Rohrer, Reichenbach (CH)

(73) Assignee: SOCIETE DES PRODUITS NESTLE S.A., Vevey (CH)

( * ) Notice: Subject to any disclaimer, the term of this patent is extended or adjusted under 35 U.S.C. 154(b) by 559 days.

(21) Appl. No.: 17/759,380

(22) PCT Filed: Jan. 29, 2021

(86) PCT No.: PCT/EP2021/052154
§ 371 (c)(1),
(2) Date: Jul. 25, 2022

(87) PCT Pub. No.: WO2021/152122
PCT Pub. Date: Aug. 5, 2021

(65) Prior Publication Data
US 2023/0058413 A1 Feb. 23, 2023

(30) Foreign Application Priority Data
Jan. 31, 2020 (EP) .................................... 20154976

(51) Int. Cl.
*A23L 7/10* (2016.01)
*A23C 11/10* (2025.01)
*A23L 7/139* (2016.01)

(52) U.S. Cl.
CPC .............. *A23L 7/198* (2016.08); *A23C 11/10* (2013.01); *A23L 7/139* (2016.08)

(58) Field of Classification Search
CPC ......... A23C 11/10; A23C 11/00; A23C 11/02; A23C 11/06
See application file for complete search history.

(56) References Cited

U.S. PATENT DOCUMENTS 4,129,664 A 12/1978 Kruseman et al.
4,908,223 A * 3/1990 Murtaugh ................ A23G 9/04
426/804

(Continued)

FOREIGN PATENT DOCUMENTS

| CA | 1332032 | 9/1994 |
| CA | 3056844 | 1/2019 |

(Continued)

OTHER PUBLICATIONS

The Tough Cookie "How to make flour buttercream or ermine buttercream—The battle of the buttercreams 2.0", https://thetoughcookie.com/2015/06/07/how-to-make-flour-buttercream-or-ermine-buttercream-the-battle-of-the-buttercreams-2-0/, published online Jun. 7, 2015, retrieved Mar. 7, 2025 (Year: 2015).*

(Continued)

*Primary Examiner* — Michele L Jacobson
(74) *Attorney, Agent, or Firm* — Calfee, Halter & Griswold LLP

(57) ABSTRACT

The present invention relates to food compositions that are suitable dairy-free substitutes for sweetened condensed milk, processes for making such food compositions, and uses thereof.

11 Claims, 5 Drawing Sheets

(56) References Cited

U.S. PATENT DOCUMENTS

| | | | | |
|---|---|---|---|---|
| 5,258,199 | A * | 11/1993 | Moore | A21D 13/80 |
| | | | | 426/660 |
| 8,658,235 | B2 * | 2/2014 | D'Agostino | A23G 9/46 |
| | | | | 426/524 |
| 2007/0110869 | A1 * | 5/2007 | Horstman | A21D 2/181 |
| | | | | 426/549 |
| 2009/0047385 | A1 | 2/2009 | Hansa et al. | |
| 2014/0193563 | A1 * | 7/2014 | Carder | A21D 6/003 |
| | | | | 426/549 |
| 2016/0213026 | A1 * | 7/2016 | Lepagnol | A23G 9/46 |
| 2020/0093167 | A1 * | 3/2020 | Pattillo | A23J 1/008 |
| 2022/0330593 | A1 * | 10/2022 | Pattillo | C12P 21/00 |
| 2023/0058413 | A1 * | 2/2023 | Sanchez Licea | A23L 7/198 |
| 2024/0381888 | A1 * | 11/2024 | Inoue | A23L 35/10 |

FOREIGN PATENT DOCUMENTS

| | | |
|---|---|---|
| CN | 103826470 A | 5/2014 |
| JP | 62166859 | 7/1987 |
| WO | 0030457 | 6/2000 |

OTHER PUBLICATIONS

Mary "Easy Vegan Sweetened Condensed Milk" https://www.marystestkitchen.com/easy-vegan-sweetened-condensed-milk/ published online Jan. 24, 2015, retrieved Jul. 21, 2025 (Year: 2015).*

* cited by examiner

A

B

METHOD OF MAKING A DAIRY-FREE SWEETENED CONDENSED MILK

CROSS REFERENCE TO RELATED APPLICATIONS

The present application is a National Stage of International Application No. PCT/EP2021/052154, filed on Jan. 29, 2021, which claims priority to European Patent Application No. 20154976.3, filed on Jan. 31, 2020, the entire contents of which are being incorporated herein by reference.

FIELD OF THE INVENTION

The present invention relates to food compositions that are suitable dairy-free substitutes for sweetened condensed milk, processes for making such food compositions, and uses thereof.

BACKGROUND TO THE INVENTION

Sweetened condensed milk (SCM) is a long shelf-life milk product that is used worldwide in cookery, for example for sugar confectionery, bakery and preparing desserts, and as a creaming option for tea and coffee. SCM is obtained by removing some of the water from milk, and adding sugar.

However, consumers worldwide are reducing their consumption of animal products for health, environmental and animal welfare reasons. Furthermore, lactose intolerance is a common digestive problem, and milk allergy is one of the most common allergies. As a result, the demand for plant-based products as milk alternatives is growing rapidly.

Dairy alternatives typically use almonds, soy, coconuts, rice, pulses, seeds or oats (see Mascaraque, "*"Free From" Food Movement: Driving Growth in Health and Wellness Space*", Euromonitor 2017). However, there is a need for further dairy-free food compositions, particularly for further dairy-free SCM substitutes, very few of which are currently available.

Cereal-based food compositions have the potential to be suitable dairy-free food compositions. Ideally, such cereal-based food compositions would have optimal properties (such as stability, flavour, texture, appearance, consistency and viscosity) for efficient industrial production and to match the tastes of consumers. However, the complexities of gelatinization mean that the optimization of cereal-based food compositions and processes for making them is far from straightforward. The present invention addresses this problem.

SUMMARY OF THE INVENTION

The inventors found that the gelatinization properties of flours were significantly influenced by the high sugar content required for a cereal-based SCM substitute. In particular, the inventors surprisingly found that food compositions with specific limitations on the amount of added sugar, total sugars, total solids and water have excellent stability, flavour, texture, appearance, consistency and viscosity; may be produced by particular methods on small to large scale; and are suitable for use as SCM substitutes.

Accordingly, the present invention provides food compositions that are suitable substitutes for SCM, processes for preparing the food compositions, and the use of such food compositions as SCM substitutes.

In a first aspect, the invention provides a process for preparing a food composition, comprising:
i) preparing a mixture comprising flour, water and added sugar;
ii) heating the mixture at about 100° C. to about 130° C., preferably about 100° C. to about 110° C., for about 2 seconds to about 12 minutes, preferably for about 2 seconds to about 2 minutes; and
iii) cooling the mixture,
wherein the mixture in step i) comprises:
a) about 60% to about 75% (weight/weight) total solids; and
b) about 48% to about 55% (weight/weight) total sugars,
and wherein the weight ratio of total added sugar to water in the food composition ranges from about 1.63:1 to about 1.82:1, preferably about 1.78:1, and wherein the flour is cereal flour and the cereal flour comprises hydrolysed flour.

Preferably, the weight ratio of total added sugar to water in the mixture in step i) ranges from about 1.63:1 to about 1.82:1, preferably about 1.78:1.

In some embodiments, the food composition comprises about 65 to 70% (weight/weight) total solids and about 49% to about 53% (weight/weight) total sugars.

In some embodiments, the food composition comprises about 65 to 70% (weight/weight) total solids and about 49% to about 53% (weight/weight) total sugars, and the weight ratio of total added sugar to water in the mixture in step i) ranges from about 1.65:1 to about 1.80:1.

In some embodiments, the food composition comprises about 65 to 70% (weight/weight) total solids and about 49% to about 53% (weight/weight) total sugars, and the weight ratio of total added sugar to water in the mixture in step i) ranges from about 1.70:1 to about 1.75:1.

In some embodiments, the heating is carried out at about 103° C. or above or at about 107° C. or above, preferably at about 103 to about 110° C. or at about 107 to about 110° C.; and the mixture in step i) comprises about 70% to about 75% (weight/weight) total solids.

The heating may be carried out at about 103° C., about 104° C., about 105° C., about 106° C., about 107° C., about 108° C., about 109° C. or about 110° C., and the mixture in step i) may comprise about 70%, about 71%, about 72%, about 73%, about 74% or about 75% (weight/weight) total solids.

In some embodiments:
a) the heating is carried out at about 100° C.;
b) the mixture in step i) comprises about 60% (weight/weight) total solids;
c) about 70% to about 90% (weight/weight) of the total added sugar is added in step i); and
d) about 10% to about 30% (weight/weight) of the total added sugar is added after heating in step ii) and before cooling in step iii).

For example, about 70% to about 85%, about 70% to about 80%, about 70% to about 75%, about 75% to about 90%, about 75% to about 85%, about 75% to about 80%, about 80% to about 90%, about 80% to about 85% or about 85% to about 90% (weight/weight) of the total added sugar may be added in step i); and about 10% to about 25%, about 10% to about 20%, about 10% to about 15%, about 15% to about 30%, about 15% to about 25%, about 15% to about 20%, about 20% to about 30%, about 20% to about 25% or about 25% to about 30% (weight/weight) of the total added sugar may be added after heating in step ii) and before cooling in step iii). Preferably, about 75% to about 85% (weight/weight) of the total added sugar may be added in step i); and about 15% to about 25% (weight/weight) of the total added sugar may be added after heating in step ii) and before cooling in step iii). Most preferably, about 80% (weight/weight) of the total added sugar may be added in step i); and about 20% (weight/weight) of the total added sugar may be added after heating in step ii) and before cooling in step iii).

In some embodiments, the heating is performed for about 2 seconds to about 12 minutes. For example, the heating may be performed for about 2 seconds to about 10 minutes, about 2 seconds to about 8 minutes, about 2 seconds to about 5 minutes, about 2 seconds to about 2 minutes, about 5 seconds to about 12 minutes, about 5 seconds to about 10 minutes, about 5 seconds to about 8 minutes, about 5 seconds to about 5 minutes, about 5 seconds to about 2 minutes, about 10 seconds to about 12 minutes, about 10 seconds to about 10 minutes, about 10 seconds to about 8 minutes, about 10 seconds to about 5 minutes or about 10 seconds to about 2 minutes. Preferably, the heating is performed for about 2 seconds to about 2 minutes.

In some embodiments, the heating is performed for about 2 to about 20 seconds. For example, the heating may be performed for about 2 to about 15 seconds, about 2 to about 10 seconds, about 2 to about 5 seconds, about 5 to about 20 seconds, about 5 to about 15 seconds, about 5 to about 10 seconds, about 10 to about 20 seconds, about 10 to about 15 seconds or about 15 to about 20 seconds. Preferably, the heating is performed for about 5 to about 10 seconds.

In some embodiments, the heating may be performed indirectly in a holding tube, optionally with a back-pressure regulator.

In some embodiments, the heating may be performed by direct steam injection.

In some embodiments, a homogenization step is performed between steps ii) and iii). For example, the homogenization may be carried out at 120/30 or 180/40 bar. Preferably, the homogenization is carried out at 180/40 bar.

In a second aspect, the invention provides a food composition obtainable by the process for preparing a food composition according to the first aspect.

In a third aspect, the invention provides a food composition comprising:
i) flour;
ii) water; and
iii) added sugar,
wherein the food composition comprises:
a) about 60% to about 75% (weight/weight) total solids; and
b) about 48% to about 55% (weight/weight) total sugars, and wherein the weight ratio of total added sugar to water in the food composition ranges from about 1.63:1 to about 1.82:1, preferably about 1.78:1.

In some embodiments, the food composition according to the third aspect is obtainable by the process for preparing the food composition according to the first aspect.

In some embodiments, the mixture in step i) comprises about 65 to 70% (weight/weight) total solids and about 49% to about 53% (weight/weight) total sugars.

In some embodiments, the mixture in step i) comprises about 65 to 70% (weight/weight) total solids and about 49% to about 53% (weight/weight) total sugars, and the weight ratio of total added sugar to water in the mixture in step i) ranges from about 1.65:1 to about 1.80:1.

In some embodiments, the mixture in step i) comprises about 65 to 70% (weight/weight) total solids and about 49% to about 53% (weight/weight) total sugars, and the weight ratio of total added sugar to water in the mixture in step i) ranges from about 1.70:1 to about 1.75:1.

In some embodiments, the food composition has a viscosity of 4,000 to 40,000 mPa·s, as measured at 20° C. and at a shear rate of 4.7 s$^{-1}$ Preferably, the viscosity is measured using a HAAKE Viscometer VT-550 equipped with a T/SV-DIN rotor.

The food composition may have a viscosity of about 4,000 to about 35,000 mPa·s, about 4,000 to about 30,000 mPa·s, about 4,000 to about 25,000 mPa·s, about 4,000 to about 20,000 mPa·s, about 4,000 to about 15,000 mPa·s, about 4,000 to about 10,000 mPa·s, 10,000 to about 40,000 mPa·s, 10,000 to about 35,000 mPa·s, 10,000 to about 30,000 mPa·s, about 10,000 to about 25,000 mPa·s, about 10,000 to about 20,000 mPa·s, about 10,000 to about 15,000 mPa·s, 15,000 to about 40,000 mPa·s, 15,000 to about 35,000 mPa·s, 15,000 to about 30,000 mPa·s, about 15,000 to about 25,000 mPa·s, about 15,000 to about 20,000 mPa·s, 20,000 to about 40,000 mPa·s, 20,000 to about 35,000 mPa·s, 20,000 to about 30,000 mPa·s, about 20,000 to about 25,000 mPa·s, 25,000 to about 40,000 mPa·s, 25,000 to about 35,000 mPa·s, 25,000 to about 30,000 mPa·s, 30,000 to about 40,000 mPa·s, 30,000 to about 35,000 mPa·s or 35,000 to about 40,000 mPa·s. Preferably the food composition has a viscosity of about 8,000 to about 22,000 mPa·s, most preferably about 10,000 to about 20,000 mPa·s.

Preferably, the flour referred to herein is a cereal flour, including whole and hydrolysed flour, in particular oat flour, rice flour, barley flour and/or wheat flour.

In some embodiments, the mixture of step i) or food composition as defined herein comprises about 15% to about 26% (weight/weight) flour. For example, the content of flour may be about 15%, about 16%, about 17%, about 18%, about 19%, about 20%, about 21%, about 22%, about 23%, about 24%, about 25% or about 26% (weight/weight).

In some embodiments, whole flour is used in combination with hydrolysed flour. The whole flour may be any cereal flour, for example whole rice, barley, wheat and/or oat flour.

Preferably, the flour is whole oat flour. The hydrolysed flour may be any hydrolysed cereal flour, such as hydrolysed oat, wholegrain and/or rice flour. Preferably, the hydrolysed flour is hydrolysed rice flour.

Preferably, the mixture of step i) or food composition as defined herein comprises about 5% to about 7% (weight/weight) whole flour, for example whole oat flour, and about 10% to about 19% (weight/weight) hydrolysed flour. The mixture of step i) or food composition as defined herein may comprise about 5%, about 6% or about 7% (weight/weight) whole flour, for example whole oat flour. Preferably, the mixture of step i) or food composition as defined herein comprises about 6% (weight/weight) whole flour, for example whole oat flour. The mixture of step i) or food composition as defined herein may comprise about 10%, about 11%, about 12%, about 13%, about 14%, about 15%, about 16%, about 17%, about 18% or about 19% (weight/weight) hydrolysed flour. Preferably, the mixture of step i) or the food composition as defined herein comprises about 10% to about 15% (weight/weight) hydrolysed flour. More preferably, the mixture of step i) or food composition as defined herein comprises about 11% (weight/weight) hydrolysed flour.

Preferably, the mixture of step i) or food composition as defined herein comprises about 6% (weight/weight) whole flour, for example whole oat flour, and about 11% (weight/weight) hydrolysed flour.

In some embodiments, whole flour is used in combination with maltodextrin having a dextrose equivalent value of about 15 to about 20.

Preferably, the mixture of step i) or food composition defined herein comprises less than about 10% (weight/weight) whole flour and about 5% to about 20% (weight/weight) maltodextrin. More preferably, the mixture of step i) or food composition defined herein comprises less than 5% (weight/weight) whole flour and about 10% to about 15% (weight/weight) maltodextrin.

In some embodiments, the mixture of step i) or food composition as defined herein comprises or consists of:
- a) about 5% to about 7%, preferably about 6%, (weight/weight) whole oat flour;
- b) about 43% to about 53%, preferably about 48%, (weight/weight) added sugar;
- c) about 10% to about 19%, preferably about 11%, (weight/weight) hydrolysed flour;
- d) about 19% to about 35%, preferably about 27%, (weight/weight) water; and
- e) optionally, less than or equal to about 10%, preferably about 7% to about 9%, more preferably about 8%, (weight/weight) oil.

In some embodiments, the mixture of step 1) or the food composition as defined therein comprises or consists of:
- a) about 5% to about 7%, preferably about 6%, (weight/weight) rice flour;
- b) about 43% to about 53%, preferably about 48%, (weight/weight) added sugar;
- c) about 10% to about 19%, preferably about 11%, (weight/weight) hydrolysed flour;
- d) about 19% to about 35%, preferably about 27%, (weight/weight) water; and
- e) optionally, 0% to about 10%, preferably about 7% to about 9%, more preferably about 8%, (weight/weight) oil.

In some embodiments, the added sugar comprises or consists of sucrose or glucose. Preferably, the added sugar comprises or consists of sucrose.

In some embodiments, the source of the added sugar may be glucose syrup and/or honey.

Preferably, the mixture of step i) or food composition as defined herein comprises about 43% to about 53% (weight/weight) added sugar. For example, the content of added sugar may be about 43%, about 44%, about 45%, about 46%, about 47%, about 48%, about 49%, about 50%, about 51%, about 52% or about 53% (weight/weight). Preferably, the content of added sugar is about 45% to about 50% (weight/weight). More preferably, the content of added sugar may be about 48% (weight/weight).

The weight ratio of total added sugar to water in the mixture of step i) or food composition defined herein ranges from about 1.63:1 to about 1.82:1. For example, the weight ratio of total added sugar to water may be from about 1.63:1 to about 1.80:1, from about 1.63:1 to about 1.75:1, from about 1.63:1 to about 1.70:1, from about 1.63:1 to about 1.65:1, from about 1.65:1 to about 1.82:1, from about 1.65:1 to about 1.80:1, from about 1.65:1 to about 1.75:1, from about 1.65:1 to about 1.70:1, from about 1.70:1 to about 1.82:1, from about 1.70:1 to about 1.80:1, from about 1.70:1 to about 1.75:1, from about 1.75:1 to about 1.82:1, from about 1.75:1 to about 1.80:1, or from about 1.80:1 to about 1.82:1. Preferably, the weight ratio of total added sugar to water is about 1.65:1 to about 1.80:1. More preferably, the weight ratio of total added sugar to water is about 1.78:1.

The content of total sugars in the mixture of step i) or food composition as defined herein may be about 48% to about 55%. For example, the content of total sugars may be about 48%, about 49%, about 50%, about 51%, about 52%, about 53%, about 54% or about 55% (weight/weight). Preferably, the total sugar content is about 49% to about 53% (weight/weight). More preferably, the total sugar content is about 49.5% (weight/weight).

The total solids content in the mixture of step i) or food composition as defined herein may be about 60% to about 75% (weight/weight). For example, the total solids content may be about 60% to about 70%, about 60% to about 65%, about 65% to about 75%, about 65% to about 70%, or about 70% to about 75% (weight/weight).

In some embodiments, the mixture of step i) or food composition includes oil. Preferably, the oil is a plant oil, such as a vegetable oil and/or a seed oil. More preferably, the oil is sunflower oil, canola oil, rapeseed oil and/or coconut oil. Most preferably, the oil is a high oleic sunflower oil.

Some or all of the oil may be sourced from oily materials, such as coconuts, almonds, walnuts and/or hazelnuts. Preferably, some or all of the oil is sourced from milled almonds and/or coconut cream.

Preferably, the mixture of step i) or food composition defined herein comprises less than or equal to about 10% (weight/weight) oil. For example, the content of oil may be less than or equal to about 9%, about 8%, about 7%, about 6%, about 5%, about 4%, about 3%, about 2% or about 1% (weight/weight). More preferably, the content of oil is about 7% to about 9%, most preferably about 8%, (weight/weight).

In some embodiments, the mixture of step i) or food composition defined herein includes plant-based protein, for example plant-based protein that is inherently present in the ingredients of the food composition, such as the flour and oil. The mixture of step i) or food composition defined herein may instead or also include plant-based protein that is not inherently present in the other ingredients of the food composition, such as a protein isolate and/or concentrate. Examples of protein isolates and concentrates include rice protein, oat protein, pea protein, chickpea protein, faba bean protein and/or canola protein. Preferably, the plant-based protein is chickpea protein.

Preferably, the mixture of step i) or food composition defined herein comprises less than or equal to about 10% (weight/weight) plant-based protein. For example, the content of plant-based protein may be less than or equal to about 9%, about 8%, about 7%, about 6%, about 5%, about 4%, about 3%, about 2% or about 1% (weight/weight). More preferably, the content of plant-based protein is about 2% to about 7%, most preferably about 4%, (weight/weight).

In some embodiments, the mixture of step i) or food composition defined herein does not include flavourings, colourants and/or artificial sweeteners.

Preferably, the food composition has a water activity ($a_w$) of less than 0.86. More preferably, the $a_w$ is 0.80 to 0.85.

Preferably, the food composition is dairy-free. More preferably, the food composition is vegan or suitable for vegans.

Preferably, the food composition is an SCM substitute.

In a fourth aspect, the invention provides the use of the food composition according to the third aspect as a substitute for SCM.

In a fifth aspect, the invention provides a food or drink comprising the food composition according to the second or third aspect. The food composition may be an ingredient in the food or drink. The food composition may be a topping for the food or drink. The food composition may be a dessert, confectionery or a baked good. For example, the food may be a cake, flan, tiramisu, banoffee pie, key lime pie, ice cream, frozen yoghurt, kulfi, fudge, tablet, candy, caramel or dulce de leche. For example, the drink may be tea or coffee.

In some embodiments, the food or drink is dairy-free. In some embodiments, the food or drink is vegan or suitable for vegans.

DESCRIPTION OF THE DRAWINGS

FIG. 1A is a picture of a sample of product before heat-treatment.
FIG. 1B is a picture of the same product after heat-treatment. Magnification 40×, white bar=10 μm FIG. 2—Typical primary result graph of a long duration Turbiscan measurement.
A typical primary result graph of a long duration Turbiscan measurement with the delta-values for transmission (ΔT) and backscattering (ΔBS), and a photograph of the sample after 60 days of storage. The graphs show the movement of serum phase (blue square) as a function of time. Measurements were taken on days 0, 5, 15, 21, 29 and 40.

DETAILED DESCRIPTION OF THE INVENTION

Figure 1:
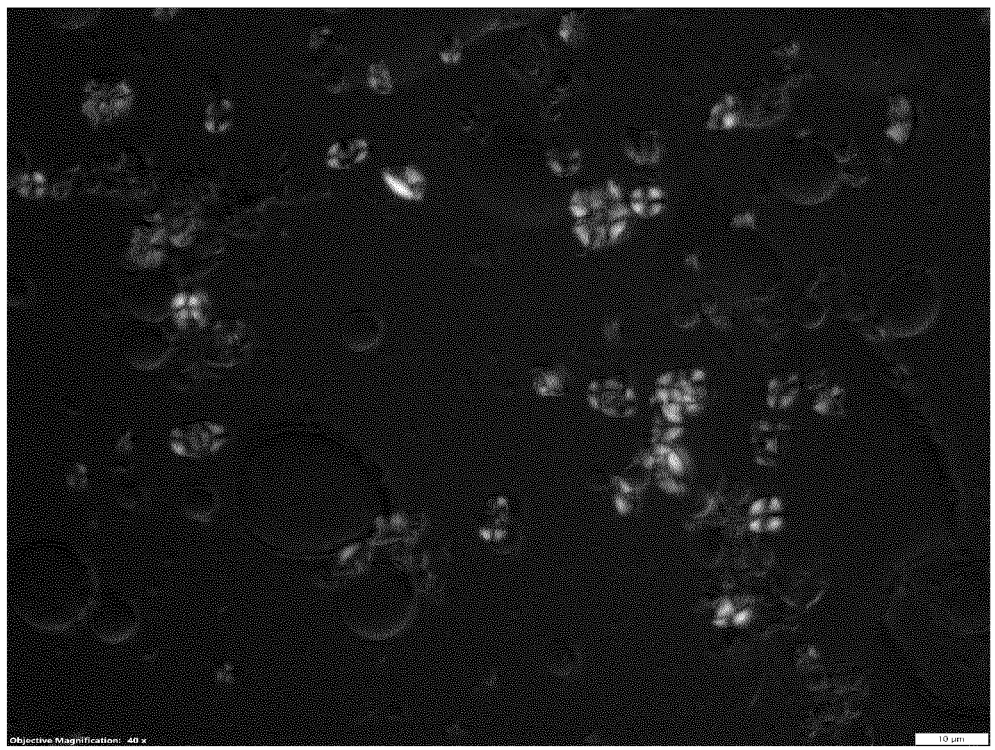
FIG. 1—Microscopy under polarized light.
Birefringence of native starch is visible under polarized light in the form of a Maltese cross.
Figure 1:
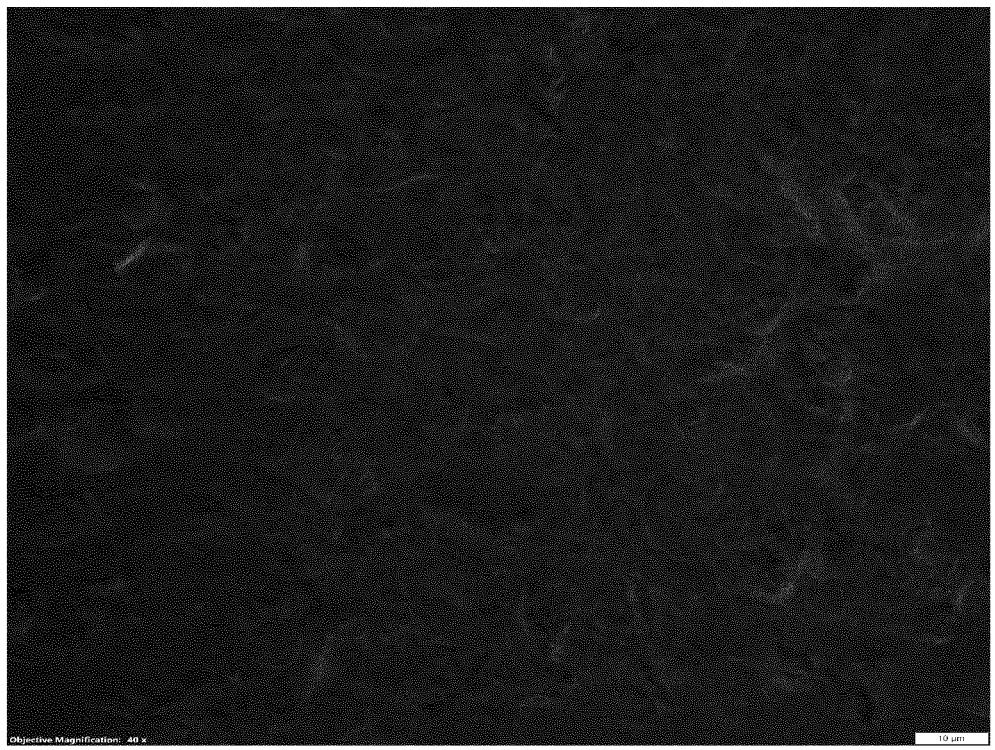

Various preferred features and embodiments of the present invention will now be described by way of non-limiting examples.

It must be noted that as used herein and in the appended claims, the singular forms "a", "an", and "the" include plural referents unless the context clearly dictates otherwise.

The terms "comprising", "comprises" and "comprised of" as used herein are synonymous with "including" or "includes"; or "containing" or "contains", and are inclusive or open-ended and do not exclude additional, non-recited members, elements or steps. The terms "comprising", "comprises" and "comprised of" also include the term "consisting of".

As used herein the term "about" means approximately, in the region of, roughly, or around. When the term "about" is used in conjunction with a numerical value or range, it modifies that value or range by extending the boundaries above and below the numerical value(s) set forth. In general, the terms "about" and "approximately" are used herein to modify a numerical value(s) above and below the stated value(s) by 10%.

The % values are in weight/weight %, unless otherwise specified.

This disclosure is not limited by the exemplary methods and materials disclosed herein, and any methods and materials similar or equivalent to those described herein can be used in the practice or testing of embodiments of this disclosure. Numeric ranges are inclusive of the numbers defining the range.

Cereal flour contains starch, which has a semi-crystalline structure and consists of two different types of polymers, amylose and amylopectin. Native starch is birefringent, and insoluble in cold water. The birefringence is visible under polarized light in the form of a Maltese cross (FIG. 1A).

When starch is heated in the presence of water, the semi-crystalline structure becomes less ordered and the starch undergoes gelatinization and pasting. This loss of internal structure occurs at different temperatures depending on the starch origin. The starch gelatinization is irreversible and very complex, and depends on the heat applied and the amount of available water. During gelatinization, the starch granules start to swell, the viscosity increases, native crystals melt, the birefringence is lost and the starch becomes dissolved in water. The temperature at which the starch begins to undergo these changes is called the "gelatinization temperature" (Thomas & Atwell, 1999 "Gelatinization, Pasting, and Retrogradation" in "Starches", St. Paul (Minnesota): Eagan Press, pages 25 to 30). This temperature is dependent on the a number of factors, including the source of starch and the amount of water available for gelatinization. Pasting is a process that overlaps with gelatinization, and results in the development of viscosity. After the starch granules swell to their maximum, amylose and amylopectin are released from the granule, meaning the starch granule structure is lost and the viscosity decreases. During cooling, the amylose molecules begin to rearrange and crystalline aggregates are formed, which is called "retrogradation". During retrogradation, the viscosity increases and a gel is formed that has a tendency to release water, which is known as "syneresis". As a result, the lower the water availability within a system, the higher its thermal stability. However, excess water is needed to achieve optimal gelatinization conditions, meaning the availability of water has an influence on the gelatinization temperature and the degree of gelatinization (Münzing, 1992 "Wärmestromregistrierende Differenz-Kalorimetrie (DSC) zur Beschreibung der Stärkeveränderung bei Getriedenährmitte" Getreide Mehl und Brot, Volume 46, pages 373 to 381).

In addition, when starch is mixed with low molecular weight carbohydrates the gelatinization temperature increases. This is possibly due to the carbohydrates hydrogen bonding with the starch, which increases its rigidity, thus hindering the swelling of starch in water, and reduces the water content available for gelatinization. The increase in the gelatinization temperature depends on the amount of carbohydrates and the molecular weight (Allan et al. 2018 "Effects of sugars and sugar alcohols on the gelatinization temperature of wheat starch" Food Hydrocolloids, Volume 84, pages 593 to 607). As the swelling of starch granules normally increases the viscosity during the starch gelatinization process, an increased sugar concentration reduces the viscosity. However, optimal viscosity and complete gelatinization are important for industrial production of the food composition, and its suitability as an SCM substitute.

Accordingly, the heating conditions and ratio of total added sugar to water are important factors that need to be optimized for the production of a flour-based food composition that is suitable for use as an SCM substitute.

Surprisingly, the present inventors have found that food compositions with specific limitations on the amount of added sugar, total sugars, total solids and water have excellent stability, flavour, texture, appearance, consistency and viscosity; may be produced by particular methods on small and large scale; and are suitable for use as SCM substitutes.

The claimed weight ratio of total added sugar to water also prevents sugar crystallization, and therefore provides excellent texture, appearance and consistency.

Moreover, the claimed methods of heating ensure gelatinization, optimal release of amylose from the starch granules, and minimal caramelization. As a result, the food compositions have excellent flavour, texture, appearance, consistency and viscosity.

Accordingly, in a first aspect, the invention provides a process for preparing a food composition, comprising:
i) preparing a mixture comprising flour, water and added sugar;
ii) heating the mixture at about 100° C. to about 130° C., preferably about 100° C. to about 110° C., for about 2 seconds to about 12 minutes, for about 2 seconds to about 2 minutes; and
iii) cooling the mixture,
wherein the mixture in step i) comprises:
a) about 60% to about 75% (weight/weight) total solids; and
b) about 48% to about 55% (weight/weight) total sugars,
and wherein the weight ratio of total added sugar to water in the food composition ranges from about 1.63:1 to about 1.82:1, preferably about 1.78:1, and wherein the flour is cereal flour and the cereal flour comprises hydrolysed flour.

In another aspect, the invention provides a process for preparing a food composition, comprising:
i) preparing a mixture comprising flour, water and added sugar;
ii) heating the mixture at about 100° C. to about 130° C., preferably about 100° C. to about 110° C., for about 2 seconds to about 12 minute, for about 2 seconds to about 2 minutes s; and
iii) cooling the mixture,
wherein the mixture in step i) comprises:
a) about 60% to about 75% (weight/weight) total solids; and
b) about 48% to about 55% (weight/weight) total sugars,
and wherein the weight ratio of total added sugar to water in the mixture in step i) ranges from about 1.63:1 to about 1.82:1, preferably about 1.78:1, and wherein the flour is cereal flour and the cereal flour comprises hydrolysed flour.

In another aspect, the invention provides a food composition obtainable by the process for preparing a food composition according to the first aspect.

In another aspect, the invention provides a food composition comprising:
i) flour;
ii) water; and
iii) added sugar,
wherein the food composition comprises:
a) about 60% to about 75% (weight/weight) total solids; and
b) about 48% to about 55% (weight/weight) total sugars,
and wherein the weight ratio of total added sugar to water in the food composition ranges from about 1.63:1 to about 1.82:1, preferably about 1.78:1.

The food composition may be used as a substitute for sweetened condensed milk (SCM). The term "condensed milk" may refer to milk that has been thickened by evaporation, and sweetened. The terms "condensed milk" and "sweetened condensed milk" (SCM) can be used interchangeably. The term "dairy-free" refers to food compositions that are substantially free from dairy products, such as milk. The term "vegan" refers to food compositions using and containing no animal products.

Water Activity ($a_w$)

As discussed above, the water activity is important to the long-term stability of the food composition. As defined herein, the "water activity" ($a_w$) refers to the partial vapour pressure present at the surface of a hygroscopic material. It is defined as being the relative humidity of a product in equilibrium with its environment when the product is placed in a closed system at a constant temperature. Preferably, the $a_w$ of the food composition is less than about 0.86, which ensures a high enough osmotic pressure to inhibit the growth of microorganisms. The inventors have surprisingly found that the optimum $a_w$ can be achieved by using the claimed ranges of total solids, total sugars and weight ratio of total added sugar to water. Therefore, excellent shelf-life can be achieved. Preferably, the food composition is preserved sufficiently due to heating and the $a_w$ of the food composition, meaning that additional chemical preservatives are unnecessary.

Flour

As mentioned above, the process of the invention comprises preparing a mixture comprising flour. Similarly, the food composition of the invention comprises flour. As defined herein, the flour may be any cereal-based flour, including whole flours and hydrolysed flours. Preferred flours are oat flour, rice flour, barley flour and wheat flour. More preferred flours are whole oat flour, hydrolysed oat flour, whole rice flour, hydrolysed rice flour, super fine rice flour and hydrolysed wholegrain rice flour.

Preferably, the mixture of step i) or the food composition as defined herein comprises about 15% to about 26% (weight/weight) flour. For example, the content of flour may be about 15%, about 16%, about 17%, about 18%, about 19%, about 20%, about 21%, about 22%, about 23%, about 24%, about 25% or about 26% (weight/weight). Preferably, the content of flour is about 17% (weight/weight).

In some embodiments, whole flour is used in combination with hydrolysed flour. The whole flour may be any cereal flour, for example whole rice, barley, wheat and/or oat flour. Preferably, the flour is whole oat flour. The hydrolysed flour may be any hydrolysed cereal flour, such as hydrolysed oat, wholegrain and/or rice flour. The inventors surprisingly found that using whole flour in combination with hydrolysed flour may improve the smoothness and reduce the viscosity of the food composition, over using whole flour alone.

Preferably, the mixture of step i) or the food composition as defined herein comprises about 5% to about 7% (weight/weight) whole flour, for example whole oat flour, and about 10% to about 19% (weight/weight) hydrolysed flour. The mixture of step i) or the food composition as defined herein may comprise about 5%, about 6% or about 7% (weight/weight) whole flour, for example whole oat flour. Preferably, the mixture of step i) or the food composition as defined herein comprises about 6% (weight/weight) whole flour, for example whole oat flour. The mixture of step i) or the food composition as defined herein may comprise about 10%, about 11%, about 12%, about 13%, about 14%, about 15%, about 16%, about 17%, about 18% or about 19% (weight/weight) hydrolysed flour. Preferably, the mixture of step i) or the food composition as defined herein comprises about 10% to about 15% (weight/weight) hydrolysed flour. More preferably, the mixture of step i) or the food composition as defined herein comprises about 11% (weight/weight) hydrolysed flour.

Preferably, the mixture of step i) or food composition as defined herein comprises about 6% (weight/weight) whole flour, for example whole oat flour, and about 11% (weight/weight) hydrolysed flour.

In some embodiments, whole flour is used in combination with maltodextrin having a dextrose equivalent value of about 15 to about 20. The term "dextrose equivalent" (DE) is used to classify sugar products, and refers to the amount of reducing sugars present in a sugar product, expressed as a percentage on a dry basis relative to dextrose, which is typically measured using Lane-Eynon titration.

Preferably, the mixture of step i) or food composition defined herein comprises less than about 10% (weight/weight) whole flour and about 5% to about 20% (weight/weight) maltodextrin. More preferably, the mixture of step i) or food composition defined herein comprises less than 5% (weight/weight) whole flour and about 10% to about 15% (weight/weight) maltodextrin.

Sugar

Added Sugar

As mentioned above, the process of the invention comprises preparing a mixture comprising added sugar. Similarly, the food composition of the invention comprises added sugar. As defined herein, the term "added sugar" refers to sugar that is not inherently present in the other ingredients of the food composition, such as the flour. Preferably, the added sugar comprises or consists of sucrose or glucose. More preferably, the added sugar comprises or consists of sucrose. The source of the added sugar may be glucose syrup and/or honey.

Preferably, the mixture of step i) or the food composition as defined herein comprises about 43% to about 53% (weight/weight) added sugar. For example, the content of added sugar may be about 43%, about 44%, about 45%, about 46%, about 47%, about 48%, about 49%, about 50%, about 51%, about 52% or about 53% (weight/weight). Preferably, the content of added sugar is about 45% to about 50% (weight/weight). More preferably, the content of added sugar is about 48% (weight/weight).

The term "total added sugar" refers to the sum of all added sugar in the food composition or used in the process for preparing the food composition as defined herein.

The term "weight ratio of total added sugar to water" refers to the weight ratio of the total added sugar to water in the food composition or used in the process for preparing the food composition. The weight ratio of total added sugar to water in the food composition ranges from about 1.63:1 to about 1.82:1. For example, the weight ratio of total added sugar to water may be from about 1.63:1 to about 1.80:1, from about 1.63:1 to about 1.75:1, from about 1.63:1 to about 1.70:1, from about 1.63:1 to about 1.65:1, from about 1.65:1 to about 1.82:1, from about 1.65:1 to about 1.80:1, from about 1.65:1 to about 1.75:1, from about 1.65:1 to about 1.70:1, from about 1.70:1 to about 1.82:1, from about 1.70:1 to about 1.80:1, from about 1.70:1 to about 1.75:1, from about 1.75:1 to about 1.82:1, from about 1.75:1 to about 1.80:1, or from about 1.80:1 to about 1.82:1. Preferably, the weight ratio of total added sugar to water is about 1.65:1 to about 1.80:1. More preferably, the weight ratio of total added sugar to water is about 1.78:1.

The inventors surprisingly found that the weight ratio of total added sugar to water of about 1.63:1 to about 1.82:1 can achieve a food composition with excellent shelf-life without crystallization of the sucrose, or other sugars present in the product. This weight ratio of total added sugar to water allows complete gelatinization of the starch, and inhibits microorganism growth by ensuring that the optimum $a_w$ is achieved. If the weight ratio of added sugar to water is less than 1.63:1, insufficient suppression of microorganism growth can result. If the weight ratio of added sugar to water is more than 1.82:1, sugar crystallization can occur.

Total Sugars

As mentioned above, the total sugar content is important to the process and food composition of the invention. As defined herein, the term "total sugars" refers to the combination of added sugar and any sugars present, for example as present in the other ingredients of the food composition. The content of total sugars may be about 48% to about 55%. For example, the content of total sugars may be about 48%, about 49%, about 50%, about 51%, about 52%, about 53%, about 54% or about 55% (weight/weight). Preferably, the total sugar content is about 49% to about 53% (weight/weight). More preferably, the total sugar content is about 49.5% (weight/weight). The inventors surprisingly managed to optimize the amount of total sugars such that microorganism growth is inhibited, by ensuring that the optimum water activity ($a_w$) is achieved.

Total Solids

As mentioned above, the total solids content is also important to the process and food composition of the invention. As defined herein, the term "total solids" refers to the total amount of solids present. The total solids content may be about 60% to about 75% (weight/weight). For example, the total solids content may be about 60% to about 70%, about 60% to about 65%, about 65% to about 75%, about 65% to about 70%, or about 70% to about 75% (weight/weight). The inventors surprisingly managed to optimize the amount of total solids such that microorganism growth is inhibited, by ensuring that the optimum water activity ($a_w$) is achieved.

Heating

During the process of the invention, the mixture of step i) is heated sufficiently to gelatinize the starch in the flour and preserve the food composition.

In particular, the mixture of step i) is heated at about 100° C. to about 110° C., for about 2 seconds to about 12 minutes, preferably for about 2 seconds to about 2 minutes. The inventors surprisingly found that these heating conditions result in a shelf-stable product with excellent taste and viscosity, due to sufficient gelatinisation of starch, optimal release of amylose from the starch granules and minimal caramelization.

Heating the mixture at a temperature lower than about 100° C. or for less than about 2 seconds provides insufficient gelatinization of starch, resulting in a food composition with low viscosity and poor texture. Heating the mixture at a temperature greater than about 110° C. can result in syneresis during storage, due to increased amylose release from the starch granules and an increased risk of retrogradation, which results in poor consistency. Heating the mixture for longer than about 2 minutes can result in increased caramelization. In some applications, a level of caramelization may be required. Therefore, it is also possible to heat the mixture for up to about 12 minutes. Heating for up to about 2 minutes provides a good balance between gelatinization of starch, caramelization and energy input.

In some embodiments, the heating is performed for about 2 seconds to about 12 minutes. For example, the heating may be performed for about 2 seconds to about 10 minutes, about 2 seconds to about 8 minutes, about 2 seconds to about 5 minutes, about 2 seconds to about 2 minutes, about 5 seconds to about 12 minutes, about 5 seconds to about 10 minutes, about 5 seconds to about 8 minutes, about 5 seconds to about 5 minutes, about 5 seconds to about 2 minutes, about 10 seconds to about 12 minutes, about 10 seconds to about 10 minutes, about 10 seconds to about 8 minutes, about 10 seconds to about 5 minutes or about 10 seconds to about 2 minutes. Preferably, the heating is performed for about 2 seconds to about 2 minutes.

In some embodiments, the heating is performed for about 2 to about 20 seconds. For example, the heating may be performed for about 2 to about 15 seconds, about 2 to about 10 seconds, about 2 to about 5 seconds, about 5 to about 20 seconds, about 5 to about 15 seconds, about 5 to about 10 seconds, about 10 to about 20 seconds, about 10 to about 15 seconds or about 15 to about 20 seconds. Preferably, the heating is performed for about 5 to about 10 seconds.

In some embodiments, the heating is carried out at about 103° C. or above or at about 107° C. or above, preferably at about 103 to about 110° C. or at about 107 to about 110° C.; and the mixture in step i) comprises at least about 70% to about 75% (weight/weight) total solids. For example, the heating may be carried out at about 103° C., about 104° C., about 105° C., about 106° C., about 107° C., about 108° C., about 109° C. or about 110° C. The mixture in step i) may comprise about 70%, about 71%, about 72%, about 73%, about 74% or about 75% (weight/weight) total solids. This method of heating is particularly useful for continuous production (i.e. in-line processing). The inventors surprisingly found that above about 103° C., complete gelatinization can occur when all of the added sugar is added during step i), resulting in a food composition with excellent consistency and viscosity.

In some embodiments, the heating is carried out at about 100° C.; the mixture in step i) comprises about 60% (weight/weight) total solids; about 70% to about 90% (weight/weight) of the total added sugar is added in step i); and about 10% to about 30% (weight/weight) of the total added sugar is added after heating in step ii) and before cooling in step iii). For example, about 70% to about 85%, about 70% to about 80%, about 70% to about 75%, about 75% to about 90%, about 75% to about 85%, about 75% to about 80%, about 80% to about 90%, about 80% to about 85% or about 85% to about 90% (weight/weight) of the total added sugar may be added in step i). For example, about 10% to about 25%, about 10% to about 20%, about 10% to about 15%, about 15% to about 30%, about 15% to about 25%, about 15% to about 20%, about 20% to about 30%, about 20% to about 25% or about 25% to about 30% (weight/weight) of the total added sugar may be added after heating in step ii) and before cooling in step iii). Preferably, about 75% to about 85% (weight/weight) of the total added sugar may be added in step i); and about 15% to about 25% (weight/weight) of the total added sugar may be added after heating in step ii) and before cooling in step iii). Most preferably, about 80% (weight/weight) of the total added sugar may be added in step i); and about 20% (weight/weight) of the total added sugar may be added after heating in step ii) and before cooling in step iii). This method of heating is particularly useful for batch production (i.e. out-of-line processing). The inventors surprisingly found that when the mixture in step i) comprises about 60% (weight/weight) total solids and about 70% to about 90% (weight/weight) of the total added sugar needed to prepare a food composition, complete gelatinization can occur by heating at about 100° C., and the food composition has excellent consistency and viscosity. If less than about 70% (weight/weight) of the total added sugar needed is added in step i) when heating is carried out at about 100° C., complete gelatinisation occurs at a lower temperature, resulting in a food composition with too high viscosity, which may increase the processing difficulty and make it unsuitable for use as an SCM substitute. If more than 90% (weight/weight) of the total added sugar is added in step i) when heating is carried out at about 100° C., incomplete gelatinization may occur, resulting in a food composition with a sandy consistency and low viscosity.

In some embodiments, the heating may be performed indirectly in a holding tube, optionally with a back-pressure regulator. The term "holding tube" refers to a method of heating a mixture by circulating the mixture in a tube that is kept at a target temperature.

In some embodiments, the heating may be performed by direct steam injection. The term "direct steam injection" refers to a method of heating a mixture, whereby hot water vapour is injected into the mixture to bring it to the target temperature and then the mixture is flash-cooled in a vacuum.

Homogenization

In some embodiments, a homogenization step is performed between steps ii) and iii) of the process referred to herein. For example, the homogenization may be carried out at 120/30 or 180/40 bar. Preferably, the homogenization is carried out at 180/40 bar. The inventors surprisingly found that the viscosity may increase with increasing homogenization pressure.

Viscosity

The viscosity of the mixture or food composition may be measured at 20° C. and at a shear rate of 4.7 s$^{-1}$ Preferably, the viscosity is measured using a HAAKE™ VT-550 Viscometer equipped with a T/SV-DIN rotor.

Preferably, the food composition has a viscosity of about 4,000 to about 40,000 mPa·s. For example, the food composition may have a viscosity of about 4,000 to about 35,000 mPa·s, about 4,000 to about 30,000 mPa·s, about 4,000 to about 25,000 mPa·s, about 4,000 to about 20,000 mPa·s, about 4,000 to about 15,000 mPa·s, about 4,000 to about 10,000 mPa·s, 10,000 to about 40,000 mPa·s, 10,000 to about 35,000 mPa·s, 10,000 to about 30,000 mPa·s, about 10,000 to about 25,000 mPa·s, about 10,000 to about 20,000 mPa·s, about 10,000 to about 15,000 mPa·s, 15,000 to about 40,000 mPa·s, 15,000 to about 35,000 mPa·s, 15,000 to about 30,000 mPa·s, about 15,000 to about 25,000 mPa·s, about 15,000 to about 20,000 mPa·s, 20,000 to about 40,000 mPa·s, 20,000 to about 35,000 mPa·s, 20,000 to about 30,000 mPa·s, about 20,000 to about 25,000 mPa·s, 25,000 to about 40,000 mPa·s, 25,000 to about 35,000 mPa·s, 25,000 to about 30,000 mPa·s, 30,000 to about 40,000 mPa·s, 30,000 to about 35,000 mPa·s or 35,000 to about 40,000 mPa·s. Preferably the food composition has a viscosity of about 8,000 to about 22,000 mPa·s, most preferably about 10,000 to about 20,000 mPa·s.

Further Ingredients

Oil

As mentioned above, the process of the invention comprises preparing a mixture which may comprise oil. Similarly, the food composition of the invention may comprise oil. The oil may be any oil known to be suitable for use in food products, including plant, animal and/or synthetic oils. Preferably, the oil is a plant oil, such as a vegetable oil and/or a seed oil. More preferably, the oil is sunflower oil, canola oil, rapeseed oil and/or coconut oil. Most preferably, the oil is a high oleic sunflower oil.

Some or all of the oil may be sourced from oily materials, such as coconuts, almonds, walnuts and/or hazelnuts. Preferably, some or all of the oil is sourced from milled almonds and/or coconut cream.

Preferably, the food composition comprises less than or equal to about 10% (weight/weight) oil. For example, the food composition may comprise less than or equal to about 9%, about 8%, about 7%, about 6%, about 5%, about 4%, about 3%, about 2% or about 1% (weight/weight) oil. More preferably, the food composition comprises about 7% to about 9%, most preferably about 8%, (weight/weight) oil.

Plant-Based Protein

As mentioned above, the process of the invention comprises preparing a mixture which may comprise plant-based protein. Similarly, the food composition of the invention may comprise plant-based protein. The plant-based protein may be inherently present in the ingredients of the food composition, such as the flour and ingredients used for their oil content. The plant-based protein may also or instead include plant-based protein that is not inherently present in the other ingredients of the food composition, such as a protein isolate and/or concentrate. Examples of protein isolates and concentrates include rice protein, oat protein, pea protein, chickpea protein, faba bean protein and/or canola protein. Preferred plant-based proteins are Rice Protein Oryzatein SG-B/N, Proatein Oat Protein, PurisPea™ 870, VegOtein P80, Nutralys S85 Plus, PISANE C9, Chickpea Protein, Vitessence™ Pulse 3600, CanolaPRO and Canola Protein Isolate. The inventors surprisingly found that adding plant-based protein to the food composition may increase the viscosity.

Preferably, the mixture of step i) or food composition defined herein comprises less than or equal to about 10% (weight/weight) plant-based protein. For example, the content of plant-based protein may be less than or equal to about 9%, about 8%, about 7%, about 6%, about 5%, about 4%, about 3%, about 2% or about 1% (weight/weight). More preferably, the content of plant-based protein is about 2% to about 7%, most preferably about 4%, (weight/weight).

Other Ingredients

The mixture of step i) or the food composition as defined herein may additionally comprise flavourings, colourants and/or artificial sweeteners. These are used in conventional amounts, which can be optimized by routine testing for any particular product formulation. However, preferably the mixture of step i) or the food composition as defined herein does not include flavourings, colourants and/or artificial sweeteners.

Preferred Mixtures and Compositions

In some embodiments, the mixture of step i) or food composition as defined herein comprises or consists of:
a) about 5% to about 7%, preferably about 6%, (weight/weight) whole oat flour;
b) about 43% to about 53%, preferably about 48%, (weight/weight) added sugar;
c) about 10% to about 19%, preferably about 11%, (weight/weight) hydrolysed flour;
d) about 19% to about 35%, preferably about 27%, (weight/weight) water; and
e) optionally, less than or equal to about 10%, preferably about 7% to about 9%, more preferably about 8%, (weight/weight) oil.

In some embodiments, the mixture of step i) or food composition as defined herein comprises or consists of:
a) about 5% to about 7% (weight/weight) whole oat flour;
b) about 45% to about 50% (weight/weight) added sugar;
c) about 10% to about 19% (weight/weight) hydrolysed flour; and
d) about 19% to about 35% (weight/weight) water.

In some embodiments, the mixture of step i) or food composition as defined herein comprises or consists of:
a) about 5% to about 7% (weight/weight) whole oat flour;
b) about 45% to about 50% (weight/weight) added sugar;
c) about 10% to about 19% (weight/weight) hydrolysed flour;
d) about 19% to about 35% (weight/weight) water; and
e) about 7% to about 9% (weight/weight) oil.

In some embodiments, the mixture of step i) or food composition as defined herein comprises or consists of:
a) about 5% to about 7% (weight/weight) whole oat flour;
b) about 43% to about 53% (weight/weight) added sugar;
c) about 10% to about 15% (weight/weight) hydrolysed flour; and
d) about 19% to about 35% (weight/weight) water.

In some embodiments, the mixture of step i) or food composition as defined herein comprises or consists of:
a) about 5% to about 7% (weight/weight) whole oat flour;
b) about 43% to about 53% (weight/weight) added sugar;
c) about 10% to about 15% (weight/weight) hydrolysed flour;
d) about 19% to about 35% (weight/weight) water; and
e) about 7% to about 9% (weight/weight) oil.

In some embodiments, the mixture of step i) or food composition as defined herein comprises or consists of:
a) about 5% to about 7% (weight/weight) whole oat flour;
b) about 43% to about 53% (weight/weight) added sugar;
c) about 10% to about 19% (weight/weight) hydrolysed flour; and
d) about 25% to about 30% (weight/weight) water.

In some embodiments, the mixture of step i) or food composition as defined herein comprises or consists of:
a) about 5% to about 7% (weight/weight) whole oat flour;
b) about 43% to about 53% (weight/weight) added sugar;
c) about 10% to about 19% (weight/weight) hydrolysed flour;
d) about 25% to about 30% (weight/weight) water; and
e) about 7% to about 9% (weight/weight) oil.

In some embodiments, the mixture of step i) or food composition as defined herein comprises or consists of:
a) about 5% to about 7% (weight/weight) whole oat flour;
b) about 45% to about 50% (weight/weight) added sugar;
c) about 10% to about 15% (weight/weight) hydrolysed flour; and
d) about 19% to about 35% (weight/weight) water.

In some embodiments, the mixture of step i) or food composition as defined herein comprises or consists of:
a) about 5% to about 7% (weight/weight) whole oat flour;
b) about 45% to about 50% (weight/weight) added sugar;
c) about 10% to about 15% (weight/weight) hydrolysed flour;
d) about 19% to about 35% (weight/weight) water; and
e) about 7% to about 9% (weight/weight) oil.

In some embodiments, the mixture of step i) or food composition as defined herein comprises or consists of:
a) about 5% to about 7% (weight/weight) whole oat flour;
b) about 45% to about 50% (weight/weight) added sugar;
c) about 10% to about 19% (weight/weight) hydrolysed flour; and
d) about 25% to about 30% (weight/weight) water.

In some embodiments, the mixture of step i) or food composition as defined herein comprises or consists of:
a) about 5% to about 7% (weight/weight) whole oat flour;
b) about 45% to about 50% (weight/weight) added sugar;
c) about 10% to about 19% (weight/weight) hydrolysed flour;
d) about 25% to about 30% (weight/weight) water; and
e) about 7% to about 9% (weight/weight) oil.

In some embodiments, the mixture of step i) or food composition as defined herein comprises or consists of:
a) about 5% to about 7% (weight/weight) whole oat flour;
b) about 43% to about 53% (weight/weight) added sugar;
c) about 10% to about 15% (weight/weight) hydrolysed flour; and
d) about 25% to about 30% (weight/weight) water.

In some embodiments, the mixture of step i) or food composition as defined herein comprises or consists of:
a) about 5% to about 7% (weight/weight) whole oat flour;
b) about 43% to about 53% (weight/weight) added sugar;
c) about 10% to about 15% (weight/weight) hydrolysed flour;
d) about 25% to about 30% (weight/weight) water; and
e) about 7% to about 9% (weight/weight) oil.

In some embodiments, the mixture of step i) or food composition as defined herein comprises or consists of:
a) about 5% to about 7% (weight/weight) whole oat flour;
b) about 45% to about 50% (weight/weight) added sugar;
c) about 10% to about 15% (weight/weight) hydrolysed flour; and
d) about 25% to about 30% (weight/weight) water.

In some embodiments, the mixture of step i) or food composition as defined herein comprises or consists of:
a) about 5% to about 7% (weight/weight) whole oat flour;
b) about 45% to about 50% (weight/weight) added sugar;
c) about 10% to about 15% (weight/weight) hydrolysed flour;
d) about 25% to about 30% (weight/weight) water; and
e) about 7% to about 9% (weight/weight) oil.

In some embodiments, the mixture of step i) or food composition as defined herein comprises or consists of:
a) about 5% to about 7% (weight/weight) whole oat flour;
b) about 43% to about 53% (weight/weight) added sugar;
c) about 10% to about 19% (weight/weight) hydrolysed flour; and
d) about 19% to about 35% (weight/weight) water.

In some embodiments, the mixture of step i) or food composition as defined herein comprises or consists of:
a) about 5% to about 7% (weight/weight) whole oat flour;
b) about 43% to about 53% (weight/weight) added sugar;
c) about 10% to about 19% (weight/weight) hydrolysed flour;
d) about 19% to about 35% (weight/weight) water; and
e) less than or equal to about 10% (weight/weight) oil.

Food and Drinks Comprising the Food Composition

The invention provides a food or drink comprising the food composition as defined herein. The food composition may be an ingredient in the food or drink. The food composition may be a topping for the food or drink. The food composition may be a dessert, confectionery or a baked good. For example, the food may be a cake, flan, tiramisu, banoffee pie, key lime pie, ice cream, frozen yoghurt, kulfi, fudge, tablet, candy, caramel or dulce de leche. For example, the drink may be tea or coffee.

Preferably, the food or drink is dairy-free. In some embodiments, the food or drink is vegan or suitable for vegans.

Those skilled in the art will understand that they can freely combine all features of the present invention disclosed herein. In particular, features described for the product of the present invention may be combined with the process of the present invention and vice versa. Furthermore, features described for different embodiments of the present invention may be combined. Where known equivalents exist for specific features, such equivalents are incorporated as if specifically referred to in this specification. Further advantages and features of the present invention are apparent from the Figures and non-limiting Examples.

EXAMPLES

The invention will now be further described by way of Examples, which are meant to serve to assist one of ordinary skill in the art in carrying out the invention and are not intended in any way to limit the scope of the invention.

Example 1—Preparation of SCM Substitute 1

48.0 g white sugar, 4.0 g flour, 13.0 g HerbaGEL MDE 150 hydrolysed flour, 8.0 g high oleic sunflower oil and 27.0 g water were mixed in a tank at 50° C. The mixture was then pumped through plate heat exchangers (PHE), which had a temperature of 70° C., with a flow rate of 200 kg/h. Heat treatment was carried out in the PHE at 110° C. for 5 seconds, followed by homogenization at a pressure of 180/40 bar. Subsequently, the mixture was cooled to 70° C. using a tube heat exchanger (THE), and filled into sample containers.

Example 2—Preparation of SCM Substitute 2

48.0 g White Sugar, 2.0 g Whole Oat Flour, 11.0 g Ceresweet 16 Hydrolysed Flour, 4.0 g chickpea protein, 8.0 g high oleic sunflower oil and 27.0 g water were mixed in a tank at 50° C. The mixture was then pumped through PHE, which had a temperature of 70° C., with a flow rate of 200 kg/h. Heat treatment was carried out in the PHE at 110° C. for 5 seconds, followed by homogenization at a pressure of 180/40 bar. Subsequently, the mixture was cooled to 70° C. using a THE, and filled into sample containers.

Example 3—Preparation of SCM Substitute 3

38.4 g white sugar and 27.0 g water were mixed and heated to 100° C. using a VISCO JET®. Steam was fed directly into the double jacket. When the temperature of the VISCO JET® reached 100° C., 6.0 g whole oat flour was added, and heating was continued for 10 min (first heating). Then, 9.6 g white sugar, 11.0 g Ceresweet 16 hydrolysed flour and 8.0 g high oleic sunflower oil were added, and heating was continued for 10 min (second heating). Subsequently, the mixture was cooled, and filled into sample containers.

Example 4—Characterization of the SCM Substitutes

Viscosity

The viscosity of samples of SCM Substitutes 1 to 3 was measured. Three shear rates were applied, each one for 30 seconds and at a temperature of 20° C. First the sample was sheared at 4.714 1/s, then at 14.72 1/s and the last shear rate was at 46.02 1/s using a HAAKE™ VT-550 Viscometer (Thermo Haake GmbH, Karlsruhe, Germany) equipped with a T/SV-DIN rotor (Thermo Haake GmbH, Karlsruhe, Germany).

Water Activity

Water activity of samples of SCM Substitutes 1 to 3 was measured at 25° C. using an AquaLab (Meter Group Inc., Pullman, USA) instrument.

Gelatinization

Gelatinization of samples of SCM Substitutes 1 to 3 was assessed experimentally using a Leica DMR light microscope (Leica Microsystems, Wetzlar, Germany) with a DFC495 camera. The microscope was used in polarization mode with the polarizer at 90°. A drop of product before heat treatment was placed on a slide, and the slide was searched for native starch, which are visible in the form of Maltese crosses (FIG. 1A). A drop of product after heat treatment was place on a slide, and the slide was searched for native starch. FIG. 1B does not exhibit Maltese crosses, which confirms that gelatinisation is complete. Similar results were observed for all three SCM Substitutes 1 (FIG. 1), SCM 2 and SCM 3.

In addition, oil droplets are clearly visible on FIG. 1A, before heat-treatment, while they are less visible on FIG. 1B, after heat-treatment. This is because they oil droplets are covered by the gelatinized starch and are not as visible as before.

60 Day Stability 60 day stability of samples of SCM Substitutes 1 to 3 was measured using a Turbiscan LAB (TLAB) instrument (Formulaction, Toulouse, France). The TLAB measuring cells were filled with 20 mL of product and 0.02% sodium azide, and then sealed air-tight and stored at room temperature (between 22° C. and 25° C.). After 60 days, the serum thickness was evaluated from the transmission signal.

Figure 2:
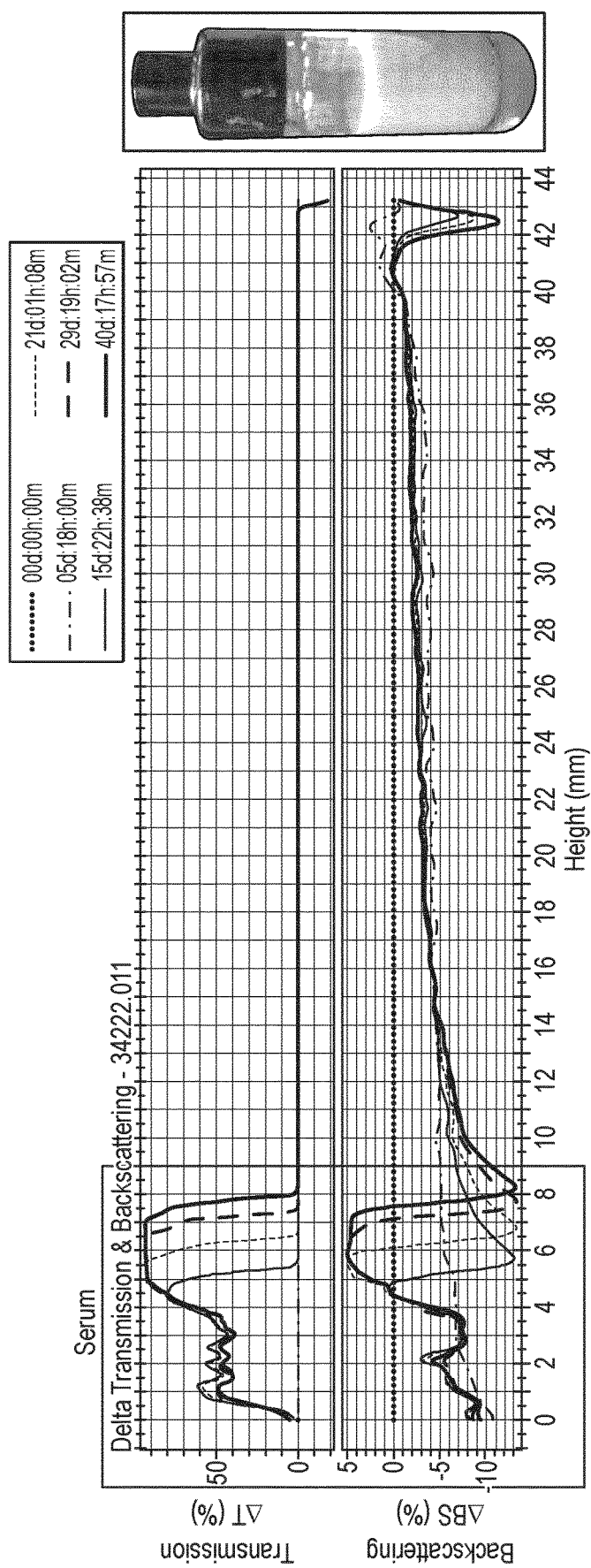

A typical primary result graph of a long duration Turbiscan measurement can be seen in FIG. 2, where phase separation has occurred over time and serum is clearly visible at the bottom of the measuring cells.

Figure 3:
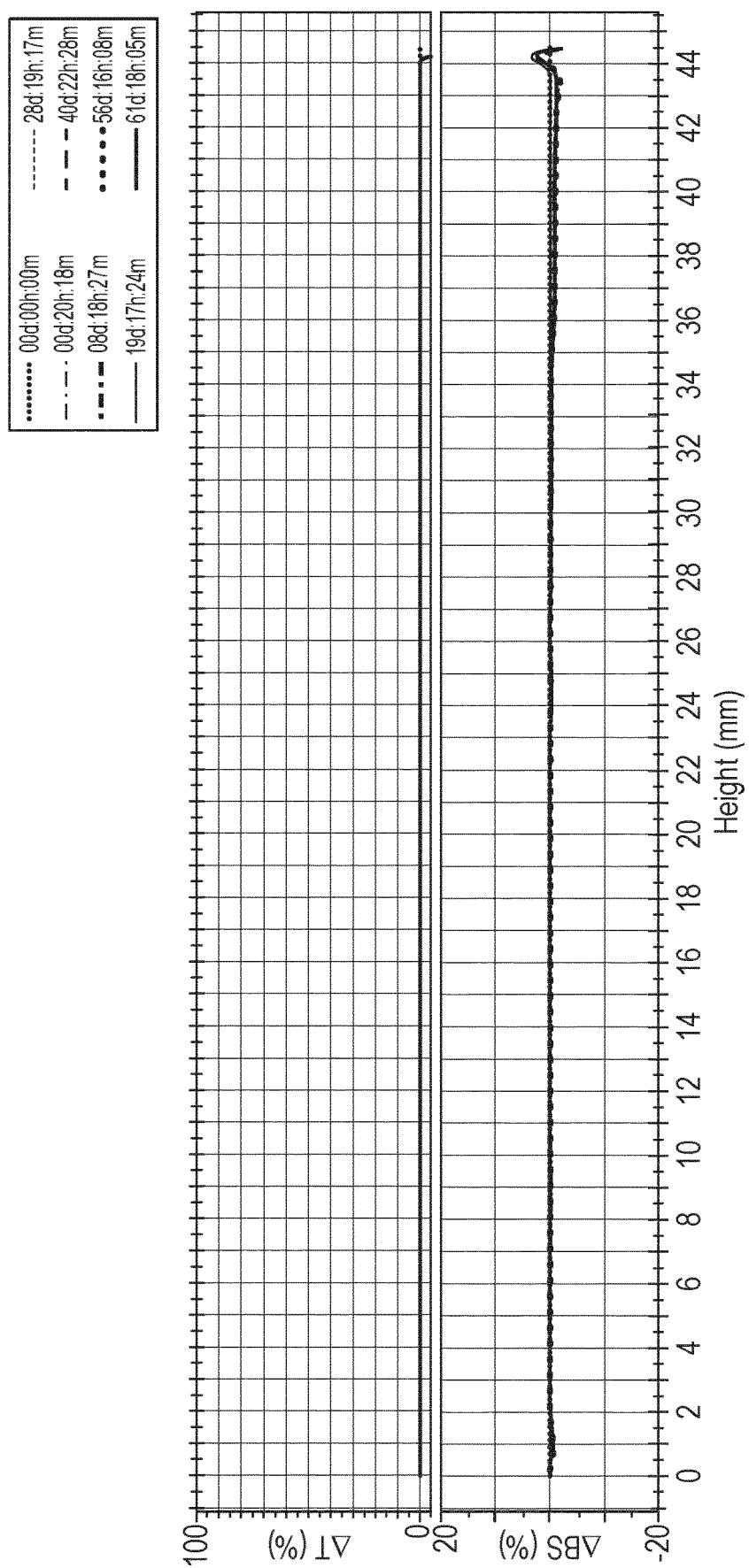
FIG. 3 to 5—Turbiscan graph for SCM Substitutes 1 to 3 respectively.
The Turbiscan graphs for SCM Substitutes 1 to 3, showing the delta-values for transmission (ΔT) and backscattering (ΔBS). Measurements were taken at the beginning of the assay then 20 hours later, at then on days 8, 19, 28, 40, 56 and 61. The SCM Substitutes show excellent stability even after 60 days.
Figure 4:
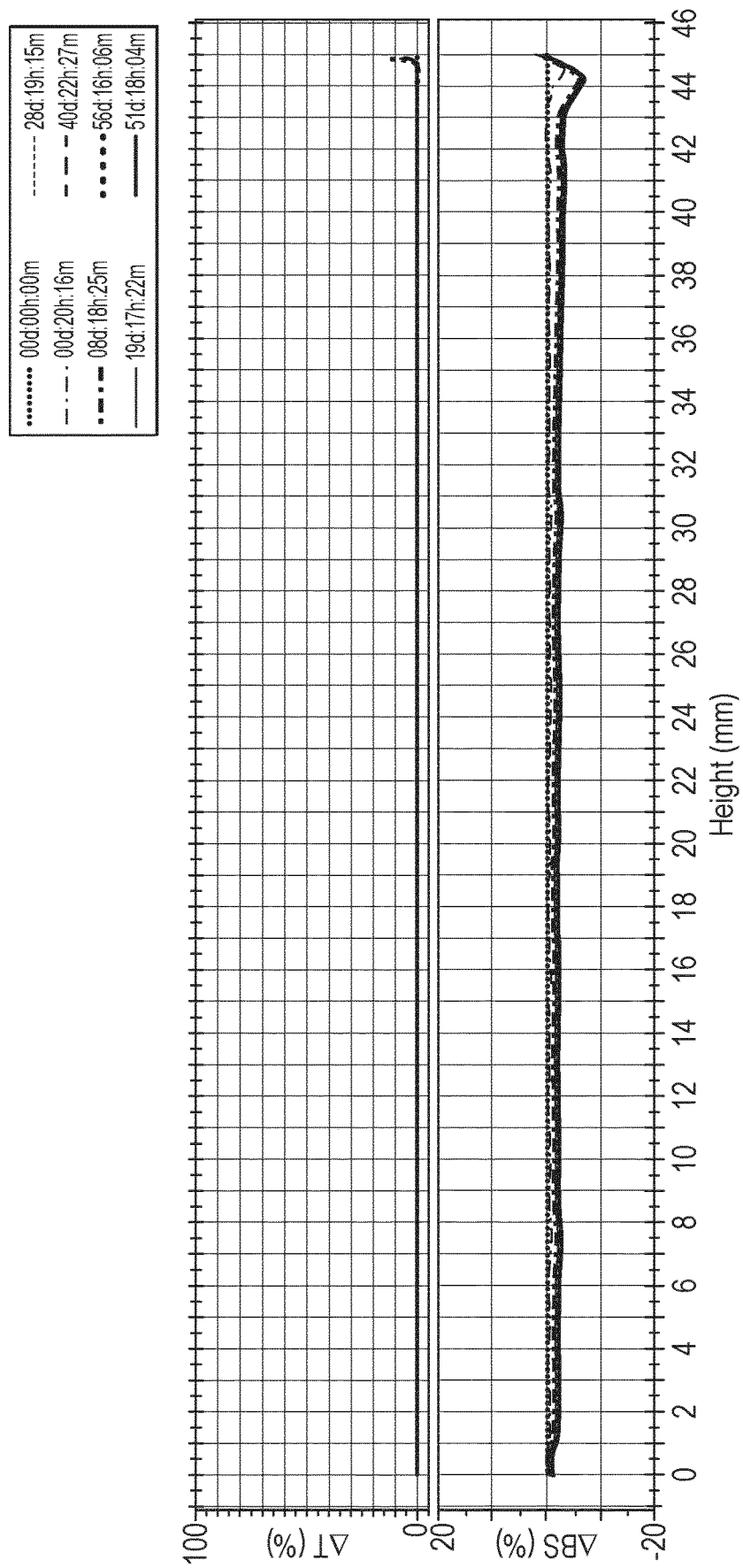
Figure 5:
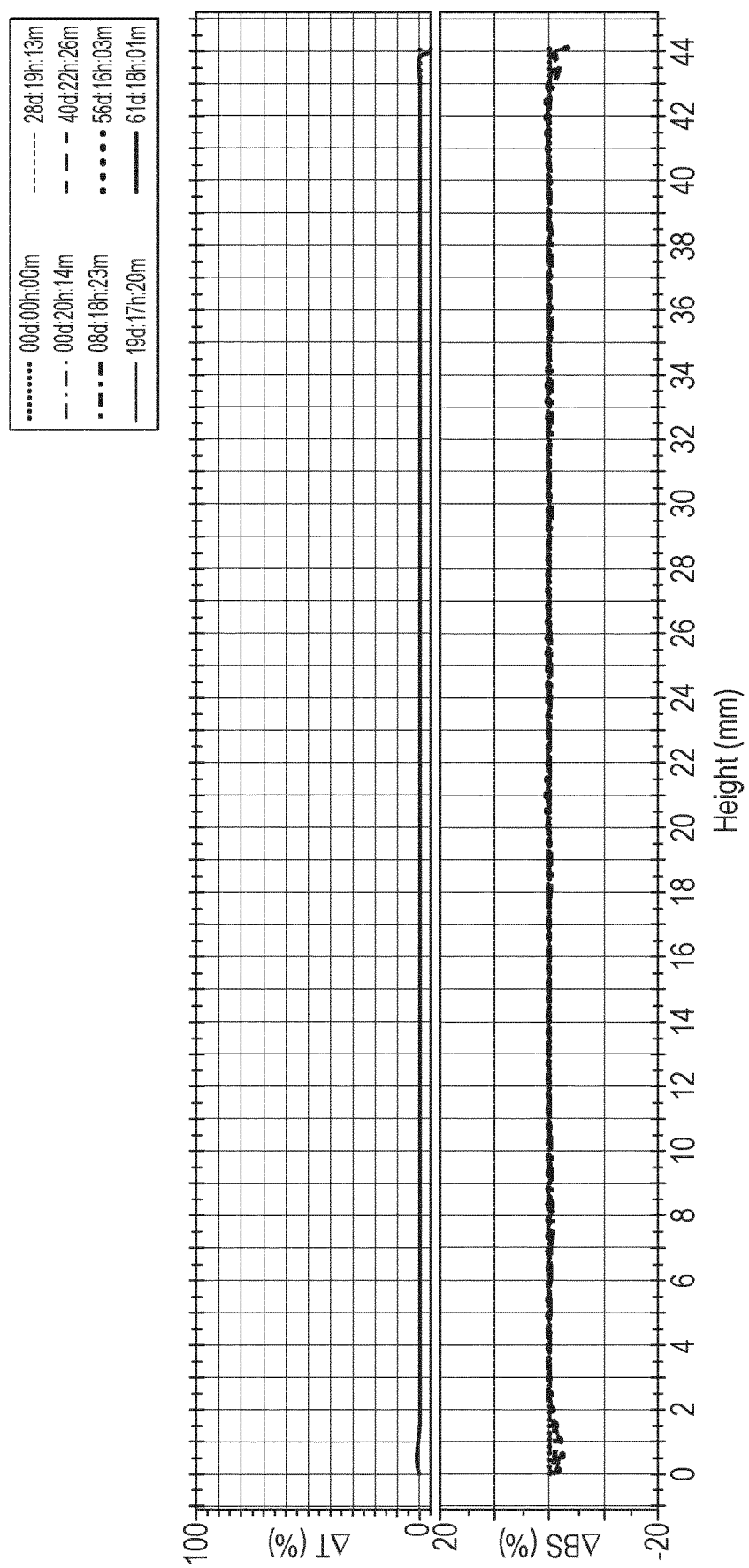

As can be seen on FIGS. 3 to 5, the SCM Substitutes 1 to 3 remained very stable over time, since the backscattering curves ($\Delta BS$) at the different measuring times during the stability test overlap. The transmission curves ($\Delta T$) at the different measuring times also overlap, but they are less relevant for opaque samples. The samples do not exhibit creaming, sedimentation or phase separation. The peak at height 44 mm is an artefact due to reaching the top of the measuring cells.

Results

As can be seen from Table 1, SCM substitutes 1 to 3 all showed complete gelatinization and excellent particle size distribution, viscosity, water activity, and stability. The Turbiscan graphs obtained when measuring the 60 day stability show excellent stability (FIGS. 3 to 5).

TABLE 1

Characterization of SCM Substitutes 1 to 3

| | Viscosity η (mPa · s) | Water activity | Gelatinization | 60 serum height (mm) |
|---|---|---|---|---|
| SCM Substitute 1 | 16 544 | 0.845 | Complete | 0.0 |
| SCM Substitute 2 | 23 295 | 0.844 | Complete | 0.0 |
| SCM Substitute 3 | 12 266 | 0.843 | Complete | 0.0 |

Example 5—Use of SCM Substitutes in Classic Sponge Cake and Classic Flan Recipes Classic Sponge Cake The following recipe was used to prepare four classic sponge cakes, using SCM Substitutes 1 to 3, and a commercially available SCM as a reference (La Lechera® sweetened and condensed milk, comprising 50 g sucrose, 20 g milk solids-not-fat, 8 g milk fat and 22 g water, per 100 g of SCM).

Ingredients (for 6 Servings):
  370 g Reference SCM or SCM Substitute 1, 2 or 3
  3 eggs
  200 g flour
  16 g baking powder
  40 g rapeseed oil Method:
  1. Pre-heat the oven to 180° C.
  2. Separate the egg whites from the egg yolks into two big bowls.
  3. To the bowl containing the egg yolks, add the flour, baking powder and SCM or SCM Substitute 1, 2 or 3.
  4. Mix the ingredients until the mixture is homogenous.
  5. Beat the egg whites until firm.
  6. Incorporate the egg whites into the mixture.
  7. Pour the mixture into moulds (buttered if needed).
  8. Bake at 180° C. for 35 min.

Classic Flan

The following recipe was used to prepare four classic flans, also using SCM Substitutes 1 to 3, and a commercially available SCM as a reference (comprising 41 g sucrose, 20 g milk solids-not-fat, 8 g milk fat and 31 g water, per 100 g of SCM).

Ingredients (for 6 Servings):
  370 g Reference SCM or SCM Substitute 1, 2 or 3
  3 eggs
  620 g UHT milk 3.5%
  10 g Philadelphia™ Cream Cheese Method:
  1. Pre-heat the oven to 180° C.
  2. Pour caramel into the bottom of each mould.
  3. In a pot, heat the milk and cream cheese.
  4. In a large bowl, mix the eggs and SCM or SCM Substitute 1, 2 or 3.
  5. Pour the heated milk mixture into the mixture in the large bowl, and mix well.
  6. Pour the mixture through a sieve into each mould, and place the moulds in an oven-proof dish.
  7. Add some water to the dish around the moulds, and bake at 180° C. for 30 min.

Results

An informal tasting was carried out to compare the sponge cakes and flans. During testing, the appearance, flavour and texture of the samples were evaluated. The sponge cake and flan samples showed that the plant-based SCM substitutes had comparable performance to the reference SCM with no significant off notes in terms of sensory properties. The sponge cake made with SCM Substitute 1 even exceeded expectations and performed better than the sponge cake made with the reference SCM.

Example 6—SCM Substitutes with Varying Amounts of Oil

Five additional SCM substitutes (A to E) were prepared with compositions set out in Table 2. For each SCM substitute, the water was heated to 100° C. in a pre-weighed Thermomix jar, then 50% of the white sugar was added and dissolved. Subsequently, the whole oat flour was added, and the mixture was stirred for 10 minutes at 100° C. (first heating). Then the remaining sugar, oil and hydrolysed rice flour were added, and the mixture was stirred for a further 10 minutes (second heating). Finally, additional water was added to replace any lost by evaporation (as measured by weight loss), and the SCM substitute was cooled to 25° C. using a water bath.

TABLE 2

Composition of SCM Substitutes A to E

| | SCM Substitute | | | | |
|---|---|---|---|---|---|
| Ingredients | A | B | C | D | E |
| White sugar/g | 392 | 384 | 384 | 384 | 384 |
| Water/g | 224 | 216 | 216 | 216 | 216 |

TABLE 2-continued

Composition of SCM Substitutes A to E

| Ingredients | SCM Substitute | | | | |
|---|---|---|---|---|---|
| | A | B | C | D | E |
| Hydrolysed whole rice grain powder/g | 136 | 136 | 120 | 104 | 88 |
| Stabilized whole oat flour/g | 48 | 48 | 48 | 48 | 48 |
| High oleic sunflower oil/g (wt %) | 0 (0) | 16 (2) | 32 (4) | 48 (6) | 64 (8) |
| Total (g) | 800 | 800 | 800 | 800 | 800 |

Viscosity

The viscosity of samples of SCM Substitutes A to E was measured at 20° C. using a HAAKE™ VT-550 Viscometer (Thermo Haake GmbH, Karlsruhe, Germany) equipped with a T/SV-DIN rotor (Thermo Haake GmbH, Karlsruhe, Germany). For the first 30 seconds, a shear rate of $4.714\ s^{-1}$ was applied. For the next 30 seconds, a shear rate of $14.72\ s^{-1}$ was applied. For the next 30 seconds, a shear rate of $46.02\ s^{-1}$ was applied. The viscosity values ($\eta$, Pa·s) were interpolated at the end of each 30 second interval.

Water Activity

Water activity of samples of SCM Substitutes A to E was measured at 25° C. using an AquaLab (Meter Group Inc., Pullman, USA) instrument.

Gelatinization

Gelatinization of samples of SCM Substitutes A to E was assessed experimentally using a Leica DMR light microscope (Leica Microsystems, Wetzlar, Germany) with a DFC495 camera. The microscope was used in polarization mode with the polarizer at 90°. A drop of product was placed on a slide before and after gelatinisation, and the slide was searched for native starch granules, which are visible in the form of Maltese crosses, as in FIG. 1A. In Table 3 below, gelatinisation is assessed as "Complete" when no or scarce native starch granules were observed under microscopy. FIG. 1A shows a sample before processing and FIG. 1B shows the same composition after processing.

Results

As can be seen from the results in Table 3, all of the SCM Substitutes had excellent viscosity, water activity and gelatinization properties. In addition, all of the SCM Substitutes had acceptable texture, colour and taste. Therefore, SCM substitutes can be prepared without oil.

TABLE 3

Characterization of SCM Substitutes A to E

| SCM Substitute | A | B | C | D | E |
|---|---|---|---|---|---|
| Oil content/wt % | 0 | 2 | 4 | 6 | 8 |
| Total solids/wt % | 70.4 | 71.1 | 70.7 | 70.0 | 71.3 |
| $a_w$ at 25° C. | 0.847 | 0.843 | 0.851 | 0.860 | 0.854 |
| Gelatinization of starch | Complete | Complete | Complete | Complete | Complete |
| $\eta$ at 30 seconds/Pa·s | 9.889 | 11.12 | 10.95 | 13.37 | 18.35 |
| $\eta$ at 60 seconds/Pa·s | 7.336 | 8.215 | 7.767 | 8.342 | 11.37 |
| $\eta$ at 90 seconds/Pa·s | 5.675 | 6.285 | 6.025 | 5.868 | 7.856 |

Example 7 —Preparation of SCM Substitutes

Example 3 was reproduced except that the first heating was conducted for 1 minute or 2 minutes instead of 10 minutes and the second heating was conducted for 1 minute or 2 minutes instead of 10 minutes. These four heat treatments resulted in products comparable to SCM Substitute 3 (see Table 1).

Example 8 —Preparation of SCM Substitutes with Varying Amounts of Oil

Example 6 was reproduced except that the first heating and the second heating were each conducted for 1 minute instead of 10 minutes. This heat treatment resulted in products comparable to SCM Substitute A to E (see Table 3).

All publications mentioned in the above specification are herein incorporated by reference. Various modifications and variations of the disclosed methods, compositions and uses of the invention will be apparent to the skilled person without departing from the scope and spirit of the invention. Although the invention has been disclosed in connection with specific preferred embodiments, it should be understood that the invention as claimed should not be unduly limited to such specific embodiments. Indeed, various modifications of the disclosed modes for carrying out the invention, which are obvious to the skilled person are intended to be within the scope of the following claims.

The invention claimed is:

1. A process for preparing a dairy-free food composition, comprising:
    i) preparing a mixture comprising flour, water and added sugar;
    ii) heating the mixture at about 100° C. to about 110° C. for about 2 seconds to about 12 minutes; and
    iii) cooling the mixture,
    wherein the mixture in step i) comprises:
        about 60% to about 75% (weight/weight) total solids; and
        about 48% to about 55% (weight/weight) total sugars, and the weight ratio of total added sugar to water in the food composition ranges from about 1.63:1 to about 1.82:1, and the flour is cereal flour and the cereal flour comprises hydrolysed flour.

2. The process for preparing a dairy-free food composition according to claim 1, wherein the heating is carried out at about 103° C.; and the mixture in step i) comprises at least about 70% to about 75% (weight/weight) total solids.

3. The process for preparing a dairy-free food composition according to claim 1, wherein:
    a) the heating is carried out at about 100° C.;
    b) the mixture in step i) comprises about 60% (weight/weight) total solids;
    c) about 70% to about 90% (weight/weight) of the total added sugar is added in step i); and
    d) about 10% to about 30% (weight/weight) of the total added sugar is added after heating in step ii) and before cooling in step iii).

4. The process for preparing a dairy-free food composition according to claim 1, wherein the heating is performed for about 2 to about 20 seconds.

5. The process for preparing a food composition according to claim 1 wherein the food composition comprises:
    a) about 5% to about 7% (weight/weight) whole oat flour;
    b) about 43% to about 53% (weight/weight) added sugar;
    c) about 10% to about 19% (weight/weight) hydrolysed flour; and
    d) about 19% to about 35% (weight/weight) water.

6. A process for preparing a dairy-free food composition, comprising:
   i) preparing a mixture comprising flour, water and added sugar;
   ii) heating the mixture at about 100° C. to about 130° C. for about 2 seconds to about 12 minutes; and
   iii) cooling the mixture,
   wherein the mixture in step i) comprises: about 60% to about 75% (weight/weight) total solids; and about 48% to about 55% (weight/weight) total sugars,
   and the weight ratio of total added sugar to water in the food composition ranges from about 1.63:1 to about 1.82:1, and the flour is cereal flour and the cereal flour comprises hydrolysed flour.

7. The process for preparing a dairy-free food composition according to claim 6, wherein the heating is carried out at about 103° C.; and the mixture in step i) comprises at least about 70% to about 75% (weight/weight) total solids.

8. The process for preparing a dairy-free food composition according to claim 6, wherein:
   a) the heating is carried out at about 100° C.;
   b) the mixture in step i) comprises about 60% (weight/weight) total solids;
   c) about 70% to about 90% (weight/weight) of the total added sugar is added in step i); and
   d) about 10% to about 30% (weight/weight) of the total added sugar is added after heating in step ii) and before cooling in step iii).

9. The process for preparing a dairy-free food composition according to claim 6, wherein the heating is performed for about 2 to about 20 seconds.

10. The process for preparing a dairy-free food composition according to claim 6 wherein the food composition comprises:
   a) about 5% to about 7% (weight/weight) whole oat flour;
   b) about 43% to about 53% (weight/weight) added sugar;
   c) about 10% to about 19% (weight/weight) hydrolysed flour; and
   d) about 19% to about 35% (weight/weight) water.

11. The process for preparing a dairy-free food composition according to claim 6 wherein the food composition is a sweetened condensed milk substitute.

* * * * *